2-AMINO-4-ALKOXY-s-TRIAZINES

Takashi Tsuda, Ikeda, Saburo Takei, Kyoto, and Teruaki Tsujikawa, Otsu, Japan, assignors to Takeda Chemical Industries, Ltd., Osaka, Japan
No Drawing. Filed Nov. 18, 1963, Ser. No. 324,242
Claims priority, application Japan, Nov. 20, 1962, 37/51,815
9 Claims. (Cl. 260—249.5)

This invention relates to novel and useful 2-amino-4-alkoxy-s-triazines. More concretely, this invention relates to the compounds represented by the formula:

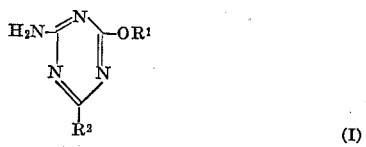

wherein $R^1$ represents methyl or ethyl and $R^2$ represents hydrogen or a lower alkyl having up to six carbon atoms, their acid addition salts, and the process for producing them. The desirable alkyl represented by $R^2$ may be, for example, methyl, ethyl, n-propyl, isopropyl, n-butyl, isobutyl, sec-butyl, n-pentyl, isopentyl and n-hexyl.

As far as the present inventors believe, the production of these compounds (I) were realized by themselves prior to anyone else. It was also found that the compounds of said category show a taming effect on animals such as mouse, rat, cat and monkey. For example, an intraperitoneal administration of any of said compounds in an amount of about 50 to 100 milligrams per kilogram of the body weight causes diminution of spontaneous activity or of conflict reflex in said animals. On the other hand, acute toxicity found in intraperitoneal administration of any of the compounds to mouse is about 850 milligrams per kilogram in terms of $LD_{50}$. There was no substantial change in pathological and histological observation of main viscera such as heart, spleen, kidney and digestive track. Accordingly, the compounds of the present invention are useful as a taming agent for veterinary use.

The principal object of the present invention is therefore to provide said novel triazine compounds which are useful as a taming agent. It is another object of this invention to provide novel methods for producing said triazine compounds.

The latter object is realized, by the following means: Guanyl-O-methylisourea or guanyl-O-ethylisourea is allowed to react with a reactive derivative of the carboxylic acid which is represented by the formula $R^2$—COOH, wherein $R^2$ has the same meaning as defined above. The reactive derivative of the carboxylic acid may for example be its acid anhydride, including the homogeneous acid anhydride and the acid halide—e.g. chloride or bromide—its ester, including the lower alkyl ester—e.g. methyl ester or ethyl ester—and the orthoester—e.g. methyl orthoester or ethyl orthoester—its nitrile or its amide. The preferable carboxylic acid represented by the formula $R^2$—COOH is exemplified by formic acid, acetic acid, propionic acid, butyric acid, isobutyric acid, valeric acid, isovaleric acid, 2-methylbutanoic acid, caproic acid and enanthic acid.

The reaction is carried out preferably in a solvent. When an ester including the orthoester is used as the reactive derivative of the carboxylic acid, it is recommended to employ as the solvent a lower alcohol such as methanol or ethanol, or a mixture of said lower alcohol and in inert organic solvent such as benzene, toluene, dioxane or tetrahydrofuran. In this case, the reaction proceeds usually at an ambient temperature or lower, but it may be accelerated by heating, if desired.

On the other hand, when an acid anhydride including the acid halide is used as the reactive derivative of the carboxylic acid, the carboxylic acid or hydrohalogenic acid, which is formed as the reaction proceeds, is desirably neutralized by a suitable base so that the reaction may be carried out smoothly. The base to be employed for this purpose may include, for example, an alkali metal hydroxide—e.g. sodium hydroxide or potassium hydroxide—an alkali metal alkoxide—e.g. sodium methoxide, sodium ethoxide, potassium methoxide or potassium ethoxide—and a tertiary amine—e.g. pyridine, trimethylamine or triethylamine. The suitable solvent in this case is exemplified by water, methanol, ethanol, dioxane, formamide, dimethylformamide, acetonitrile, tetrahydrofuran and a mixture of two or more of them. Although desirable reaction temperature is generally lower than 0° centigrade, the reaction may of course be effected at an ambient temperature or higher under heating.

Another means for producing the triazine compounds of the present invention is effected by allowing ammonia to react with a compound represented by the formula:

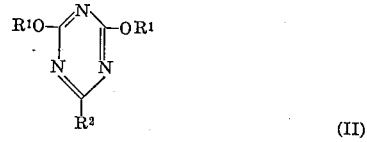

wherein $R^1$ and $R^2$ have respectively the same meaning as defined above. The starting materials, 2,4-dialkoxy-s-triazines, can easily be prepared by allowing the corresponding 2,4-dihalo-s-triazines to react with methanol or ethanol.

This reaction may be carried out with or without solvent. When used, the desired solvent may, for example, be water, an alcohol such as methanol, ethanol or propanol, an ether such as dioxane or tetrahydrofuran, and a mixture of two or more of them. It is not necessary to fully dissolve the starting material in the solvent. In order to accelerate the reaction velocity, the reaction mixture is desirably heated and/or placed in a sealed vessel. Usually, the reaction is accomplished by heating the reaction mixture at a temperature of about 70 to 100° centigrade for about two to several hours. At any rate, practically the most preferable reaction conditions should of course be selected.

The triazine compounds of the present invention are also producible by a further means which is effected by allowing methanol or ethanol to react with a compound represented by the formula:

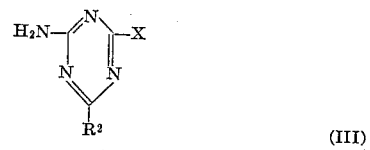

wherein $R^2$ has the same meaning as defined above and X represents a halogen such as chlorine, bromine or iodine.

This reaction is carried out under alkaline conditions or in the presence of a base. The desirable bases are, for example, an alkali metal alkoxide such as sodium methoxide, sodium ethoxide, potassium methoxide or potassium ethoxide, an alkali metal hydroxide such as sodium hydroxide or potassium hydroxide, and an amine such as pyridine, trimethylamine or triethylamine. For effecting the reaction, the use of a suitable solvent is recommended. The desirable solvents are, for example, methanol, ethanol, acetone, dioxane, tetrahydrofuran, benzene, toluene, and a mixture of two or more of them. It is especially desirable to use an excess of the alcohol which is a starting material of this reaction. Similarly, such a base as pyridine may be employed as both catalyst and solvent. The reaction proceeds at an ambient temperature. In order to accelerate the reaction velocity, the reaction mixturem ay be heated. Usually, the reaction can be desirably carried out by heating the reaction mixture at a temperature of about 40° to 160° centigrade for about ten minutes to several hours.

The free 2-amino-4-alkoxy-s-triazines represented by the Formula (I) can form the corresponding acid addition salts with an acid which is exemplified by mineral acids including hydrochloric acid, hydrobromic acid, sulfuric acid, nitric acid and carbonic acid, and organic acids including acetic acid, formic acid, succinic acid, citric acid, maleic acid, fumaric acid, tartaric acid, benzenesulfonic acid, toluenesulfonic acid, methanesulfonic acid and picric acid. These acid addition salts function to solubilize free triazines in water or to cause them to solidify when obtained in an oily state, which does not deviate from the scope of the present invention.

The following examples of presently-preferred embodiments are solely for the purpose of illustration and are not to be construed as limitations of this invention, many variations being possible without departing from the spirit or scope of this invention. In these examples, temperatures are all in degrees centigrade and uncorrected; percentages are on the weight basis; and abbreviations "g." and "cc." should be read as "gram(s)" and "cubic centimeter(s)," respectively.

*Example 1*

A solution of metallic sodium (0.8 g.) in methanol (30 cc.) is added to a solution of guanyl-O-methylisourea hydrochloride (5.1 g.) in methanol (30 cc.), and into the mixture under ice-cooling there is poured ethyl acetate (3.8 g.). The reaction mixture is allowed to stand at room temperature for four days, followed by the addition of water to make the whole volume 500 cc. The aqueous mixture is further allowed to stand for three days, whereupon crystals separate out. Crystals are recrystallized from diluted acetic acid to obtain 2-amino-4-methoxy-6-methyl-s-triazine (1.4 g.) as colorless needless melting at 256–257°.

The product is dissolved in methanolic hydrochloric acid and the solution is cooled on standing to separate colorless fine crystals of the hydrochloride, which do not show a definite melting point on heating up to 300° but color at about 220–230°.

*Example 2*

Guanyl-O-methylisourea hydrochloride (5 g.) is added to acetonitrile (25 cc.), and 20% aqueous sodium hydroxide solution (20 cc.) is poured into the mixture. To the resulting mixture, there is added dropwise a mixture of acetyl chloride (5.9 g.) and acetonitrile (10 cc.). After the addition, the reaction mixture is stirred for four hours at about 0°, allowed to stand overnight, and concentrated under reduced pressure. Water is added to the concentrate to give crystals, which are collected by filtration and recrystallized from diluted acetic acid to obtain 2-amino-4-methoxy-6-methyl-s-triazine (3.2 g.) melting at 257°. Every property of the product is identified with that of the product obtained in Example 1.

*Example 3*

Guanyl-O-methylisourea hydrochloride (5.15 g.) is added to acetonitrile (25 cc.) and the mixture is stirred. Under cooling, a solution consisting of sodium hydroxide (2.7 g.) and water (20 cc.) is poured into said mixture. Then, to the mixture being kept below 0° under agitation, there is gradually added dropwise a mixture of propionic acid chloride (2.7 g.) and acetonitrile (15 cc.). After the addition, the reaction mixture is stirred for 4 hours, allowed to stand overnight, and concentrated under reduced pressure to give crystals, which are recrystallized from water to obtain 2-amino-4-methoxy-6-ethyl-s-triazine (1.55 g.) as colorless crystals melting at 150–151°.

*Example 4*

Guanyl-O-ethylisourea hydrochloride (5.65 g.) is suspended in acetonitrile (25 cc.), and a mixture of sodium hydroxide (2.7 g.) and water (20 cc.) is poured into the suspension under cooling. To the mixture being kept below 0° under agitation, there is gradually added a mixture of propionic acid chloride (2.7 g.) and acetonitrile (15 cc.). Then, the reaction mixture is stirred for four hours, allowed to stand overnight, and concentrated under reduced pressure to give crystals, which are recrystallized from water to obtain 2-amino-4-ethoxy-6-ethyl-s-triazine (1.8 g.) as colorless pillars melting at 101–103°.

*Example 5*

Guanyl-O-ethylisourea hydrochloride (5.5 g.) is suspended in acetonitrile (25 cc.) and a mixture of sodium hydroxide (2.6 g.) and water (16 cc.) is poured into the suspension under cooling. To the mixture being kept below 0° under agitation, there is gradually added dropwise a mixture of acetyl chloride (3.9 g.) and acetonitrile (10 cc.). The reaction mixture is further stirred for five hours, allowed to stand overnight, and then concentrated under reduced pressure. Water is added to the concentrated solution to give crystals, which are recrystallized from ethanol to obtain 2-amino-4-ethoxy-6-methyl-s-triazine (1.15 g.) as colorless crystals melting at 173–175°.

*Example 6*

A sodium methoxide solution prepared from metallic sodium (1.2 g.) and methanol (32 g.) is added to a solution of guanyl-O-methylisourea hydrochloride (7.6 g.) in methanol (16 g.). Ethyl formate (3.7 g.) is poured into the solution, and the whole mixture is allowed to stand at room temperature for three days. Water is added to the reaction mixture to separate crystals, which are collected and recrystallized from acetic acid to obtain 2-amino-4-methoxy-s-triazine (1.2 g.) as colorless needles melting at 187–188°.

*Example 7*

A sodium methoxide solution prepared from metallic sodium (2.3 g.) and methanol is added to a solution of guanyl-O-methylisourea hydrochloride (15.3 g.) in methanol. Ethyl n-butyrate (11.6 g.) is dissolved in the mixture, and the whole mixture is allowed to stand at room temperature for three days. Water is added to the reaction mixture to separate crystals, which are collected and recrystallized from water to obtain 2-amino-4-methoxy-6-n-propyl-s-triazine (3.2 g.) as colorless flakes melting at 111–111.5°.

*Example 8*

Guanyl-O-methylisourea hydrochloride (5.1 g.) is suspended in acetonitrile (25 cc.), and a mixture of sodium hydroxide (2.7 g.) and water (20 cc.) is poured into the suspension under ice-cooling with agitation. To the mixture under ice-cooling there is gradually added a mixture of acetic anhydride (6.8 g.) and acetonitrile (20 cc.). The reaction mixture is further stirred for four hours, allowed to stand overnight, and concentrated under reduced pressure. Water is added to the residue to give crystals, which are recrystallized from acetic acid to obtain 2-amino-4-methoxy-6-methyl-s-triazine (2.6 g.) as colorless crystals melting at 254–256°.

*Example 9*

A solution of metallic sodium (3 g.) in methanol (80 cc.) is added to a solution of guanyl-O-methylisourea hydrochloride (10 g.) in methanol (50 cc.), followed by the addition of ethyl isovalerate (8.6 g.). The mixture is allowed to stand at room temperature for five days, and concentrated to dryness. The residue is treated with a small amount of water, and precipitates are collected and recrystallized from water to obtain 2-amino-4-methoxy-6- isobutyl-s-triazine (1 g.) as colorless needles melting at 109–110°.

Example 10

A mixture of 2,4-dimethoxy-6-ethyl-s-triazine (1.0 g.), 30% aqueous ammonia solution (0.4 cc.) and water (10 cc.) is sealed in a tube and heated at 80° for three hours. After cooling, separating crystals are collected to obtain 2-amino-4-methoxy-6-ethyl-s-triazine (0.4 g.) as crystals melting at 150–151°.

Example 11

A mixture of 2,4-dimethoxy-6-ethyl-s-triazine (1.0 g.), aqueous ammonia solution (0.6 cc.) and water (15 cc.) is sealed in a tube and heated at 60° for four hours. After cooling, separating crystals are collected to obtain 2-amino-4-methoxy-s-triazine (1.0 g.) as colorless needles melting at 187–188°.

Example 12

Metallic sodium (0.32 g.) is dissolved in methanol (30 cc.) and 2-amino-4-chloro-6-methyl-s-triazine (2 g.) is added to the solution. The mixture is refluxed for three hours, and then concentrated. The residue is treated with a small amount of water, and precipitates are collected and recrystallized from diluted acetic acid to obtain 2-amino-4-methoxy-6-methyl-s-triazine (1.0 g.) melting at 256–257°.

Having thus disclosed the invention, what is claimed is:

1. A compound selected from the group consisting of the compounds of the formula

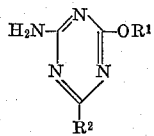

wherein $R^1$ is a member selected from the group consisting of methyl and ethyl, and $R^2$ is a member selected from the group consisting of hydrogen atom and a lower alkyl having up to six carbon atoms; and pharmacologically acceptable acid addition salts of the compounds of the above-illustrated formula.

2. The compound as claimed in claim 1, wherein the acid salt is the hydrochloride.
3. 2-amino-4-methoxy-s-triazine.
4. 2-amino-4-methoxy-6-methyl-s-triazine.
5. 2-amino-4-ethoxy-6-methyl-s-triazine.
6. 2-amino-4-methoxy-6-ethyl-s-triazine.
7. 2-amino-4-ethoxy-6-ethyl-s-triazine.
8. 2-amino-4-methoxy-6-propyl-s-triazine.
9. 2-amino-4-methoxy-6-isobutyl-s-triazine.

References Cited by the Examiner

UNITED STATES PATENTS 3,154,547  10/1964  Huffman _____ 260—249.5
3,169,963  2/1965  Peters et al. _____ 260—248

FOREIGN PATENTS 579,987  6/1959  Belgium.

OTHER REFERENCES

Abstract in Derwent Belgian Patents Report, vol. 60B, p. C20 bound January–June 1960.

Huffman et al., J. Org. Chem., vol. 28, pp. 1816–21, July 1963.

Piskala et al., Coll. Czech. Chem. Commun., vol. 28, pp. 1681–90 (July 1963).

WALTER A. MODANCE, *primary Examiner.*

JOHN D. RANDOLPH, *Examiner.*

JOHN M. FORD, *Assistant Examiner.*